(12) United States Patent
Louison (10) Patent No.: US 12,296,291 B2
(45) Date of Patent: May 13, 2025

(54) LOW RESTRICTION AIR FILTER (71) Applicant: CUMMINS FILTRATION INC., Nashville, TN (US)

(72) Inventor: Matthew Louison, McFarland, WI (US)

(73) Assignee: CUMMINS FILTRATION INC., Nashville, TN (US)

( * ) Notice: Subject to any disclaimer, the term of this patent is extended or adjusted under 35 U.S.C. 154(b) by 380 days.

(21) Appl. No.: 17/776,445

(22) PCT Filed: Nov. 10, 2020

(86) PCT No.: PCT/US2020/059838
§ 371 (c)(1),
(2) Date: May 12, 2022

(87) PCT Pub. No.: WO2021/101756
PCT Pub. Date: May 27, 2021

(65) Prior Publication Data
US 2022/0387921 A1 Dec. 8, 2022

Related U.S. Application Data

(60) Provisional application No. 62/936,774, filed on Nov. 18, 2019.

(51) Int. Cl.
*B01D 46/24* (2006.01)
*B01D 46/00* (2022.01)
(Continued)

(52) U.S. Cl.
CPC ..... *B01D 46/2414* (2013.01); *B01D 46/0005* (2013.01); *B01D 46/0046* (2013.01);
(Continued)

(58) Field of Classification Search
None
See application file for complete search history.

(56) References Cited

U.S. PATENT DOCUMENTS 3,745,753 A 7/1973 Risse
3,928,007 A 12/1975 Jackson
(Continued)

FOREIGN PATENT DOCUMENTS

CN 1647845 A 8/2005
CN 2855503 Y 1/2007
(Continued)

OTHER PUBLICATIONS

Non-Final Office Action on U.S. Appl. No. 17/836,215 issued Sep. 14, 2023.
(Continued)

*Primary Examiner* — Gabriel E Gitman
(74) *Attorney, Agent, or Firm* — Foley & Lardner LLP (57) ABSTRACT

An air cleaner system including a housing having a first housing end with an opening, a second housing end, and an inlet proximate the second housing end. The air cleaner system also includes a filter element removably installed within the housing through the opening, the filter element including filter media, a first endplate coupled to the filter media at a first filter end, an open second endplate coupled to the filter media at a second filter end, and an annular projection extending axially from the open second endplate, the annular projection sealing against the housing and creating an axial gap between the filter element and the housing.

20 Claims, 11 Drawing Sheets

(51) Int. Cl.
*B01D 46/42* (2006.01)
*F02M 35/024* (2006.01)
*B01D 46/64* (2022.01)

(52) U.S. Cl.
CPC .......... *B01D 46/4227* (2013.01); *B01D 46/64* (2022.01); *B01D 2265/028* (2013.01); *B01D 2271/022* (2013.01); *B01D 2271/027* (2013.01); *B01D 2277/30* (2013.01); *B01D 2279/60* (2013.01); *F02M 35/02416* (2013.01); *F02M 35/02433* (2013.01)

(56) References Cited

U.S. PATENT DOCUMENTS

| | | | |
|---|---|---|---|
| 4,162,905 A | 7/1979 | Schuler | |
| 5,244,755 A | 9/1993 | Benoist et al. | |
| 5,258,127 A | 11/1993 | Gsell et al. | |
| 5,295,602 A | 3/1994 | Swanson | |
| 5,315,483 A | 5/1994 | Tracy | |
| 5,545,241 A | 8/1996 | Vanderauwera et al. | |
| 5,547,480 A | 8/1996 | Coulonvaux | |
| 5,556,440 A | 9/1996 | Mullins et al. | |
| 5,730,769 A | 3/1998 | Dungs et al. | |
| 5,891,337 A | 4/1999 | Keller et al. | |
| 5,893,937 A | 4/1999 | Moessinger | |
| 5,919,279 A | 7/1999 | Merritt et al. | |
| 5,938,804 A * | 8/1999 | Engel | B01D 46/0043 55/498 |
| 6,039,778 A | 3/2000 | Coulonvaux | |
| 6,051,042 A | 4/2000 | Coulonvaux | |
| 6,146,527 A | 11/2000 | Oelschlaegel | |
| 6,152,979 A | 11/2000 | Cappuyns | |
| 6,152,996 A * | 11/2000 | Linnersten | B01D 53/0415 55/497 |
| 6,334,887 B1 | 1/2002 | Coulonvaux | |
| 6,372,132 B1 | 4/2002 | Williams | |
| 6,402,798 B1 | 6/2002 | Kallsen et al. | |
| 6,419,718 B1 | 7/2002 | Klug et al. | |
| 6,436,162 B1 | 8/2002 | Wake et al. | |
| 6,599,342 B2 | 7/2003 | Andress et al. | |
| 6,623,049 B2 | 9/2003 | Shreeve et al. | |
| 6,723,148 B2 | 4/2004 | Stass | |
| 6,902,598 B2 | 6/2005 | Gunderson et al. | |
| 6,958,083 B1 | 10/2005 | Schmitz et al. | |
| 7,063,730 B2 | 6/2006 | Connor et al. | |
| 7,070,642 B2 | 7/2006 | Scott et al. | |
| 7,097,694 B1 | 8/2006 | Jaroszczyk et al. | |
| 7,125,490 B2 | 10/2006 | Clendenning et al. | |
| 7,247,183 B2 | 7/2007 | Connor et al. | |
| 7,276,098 B2 | 10/2007 | Koslow | |
| 7,282,077 B2 | 10/2007 | Honisch et al. | |
| 7,291,198 B2 | 11/2007 | Gieseke et al. | |
| 7,314,558 B1 | 1/2008 | Jaroszczyk et al. | |
| 7,323,105 B1 | 1/2008 | Janikowski et al. | |
| 7,323,106 B2 | 1/2008 | Jaroszczyk et al. | |
| 7,413,588 B2 | 8/2008 | Holzmann et al. | |
| 7,537,631 B2 | 5/2009 | Scott et al. | |
| 7,540,895 B2 | 6/2009 | Furseth et al. | |
| 7,563,300 B2 | 7/2009 | Nishiyama et al. | |
| D600,790 S | 9/2009 | Nelson et al. | |
| 7,625,419 B2 | 12/2009 | Nelson et al. | |
| 7,645,546 B2 | 1/2010 | Yang et al. | |
| 7,658,777 B2 | 2/2010 | Kopec et al. | |
| 7,662,203 B2 | 2/2010 | Scott et al. | |
| 7,662,216 B1 | 2/2010 | Terres et al. | |
| 7,740,678 B2 | 6/2010 | Gunderson et al. | |
| 7,753,982 B2 | 7/2010 | Merritt | |
| RE41,713 E | 9/2010 | Gunderson et al. | |
| 7,789,926 B2 | 9/2010 | Rieger et al. | |
| 7,799,108 B2 | 9/2010 | Connor et al. | |
| 7,828,870 B1 | 11/2010 | Rech et al. | |
| 7,879,125 B2 | 2/2011 | Haberkamp et al. | |
| RE42,174 E | 3/2011 | Gunderson et al. | |
| 7,931,725 B2 | 4/2011 | Wydeven et al. | |
| 7,959,703 B2 | 6/2011 | Merritt et al. | |
| 7,976,601 B2 | 7/2011 | Xu et al. | |
| 7,976,602 B2 | 7/2011 | Munkel | |
| 7,981,183 B2 | 7/2011 | Nepsund et al. | |
| 7,981,186 B2 | 7/2011 | Schrage et al. | |
| 7,988,757 B2 | 8/2011 | Scott et al. | |
| 7,993,422 B2 | 8/2011 | Krisko et al. | |
| 8,038,756 B2 | 10/2011 | Iddings et al. | |
| 8,097,061 B2 | 1/2012 | Smith et al. | |
| 8,163,057 B2 | 4/2012 | Blossey et al. | |
| 8,177,874 B2 | 5/2012 | Bittle et al. | |
| 8,177,971 B2 | 5/2012 | Bittle et al. | |
| 8,216,335 B2 | 7/2012 | Scott et al. | |
| 8,286,804 B2 | 10/2012 | Weindorf | |
| 8,394,166 B2 | 3/2013 | Scott | |
| 8,460,425 B2 | 6/2013 | Scott et al. | |
| 8,545,588 B2 | 10/2013 | Iddings et al. | |
| 8,828,114 B2 | 9/2014 | Dhiman et al. | |
| 8,828,123 B2 | 9/2014 | Holzmann et al. | |
| 9,089,804 B2 | 7/2015 | Campbell et al. | |
| 9,457,308 B2 | 10/2016 | Kaufmann et al. | |
| 9,463,404 B2 | 10/2016 | Rieger et al. | |
| 9,498,743 B2 | 11/2016 | Dhiman et al. | |
| 9,511,317 B2 | 12/2016 | Ruhland et al. | |
| 9,636,608 B2 | 5/2017 | Morris et al. | |
| 10,744,442 B1 * | 8/2020 | Garside | B01D 46/0005 |
| 11,136,947 B2 | 10/2021 | Von Seggern et al. | |
| 11,311,829 B2 | 4/2022 | Nelson et al. | |
| 11,426,692 B2 | 8/2022 | Louison et al. | |
| 11,633,683 B2 | 4/2023 | Louison et al. | |
| 2002/0046556 A1 | 4/2002 | Reid | |
| 2003/0184025 A1 | 10/2003 | Matsuki | |
| 2004/0035097 A1 | 2/2004 | Schlensker et al. | |
| 2004/0134171 A1 | 7/2004 | Scott et al. | |
| 2005/0193695 A1 | 9/2005 | Holmes et al. | |
| 2006/0086075 A1 | 4/2006 | Scott et al. | |
| 2007/0102343 A1 | 5/2007 | Brown et al. | |
| 2008/0190082 A1 | 8/2008 | Scott et al. | |
| 2008/0276583 A1 | 11/2008 | Munkel | |
| 2009/0057219 A1 | 3/2009 | Bagci et al. | |
| 2009/0071111 A1 | 3/2009 | Lundgren et al. | |
| 2009/0094951 A1 | 4/2009 | Baseotto et al. | |
| 2009/0126324 A1 | 5/2009 | Smith et al. | |
| 2009/0217632 A1 * | 9/2009 | Coulonvaux | B01D 46/521 55/504 |
| 2009/0241489 A1 | 10/2009 | Becker et al. | |
| 2009/0301950 A1 | 12/2009 | Weindorf | |
| 2010/0064646 A1 | 3/2010 | Smith et al. | |
| 2010/0146920 A1 | 6/2010 | Iddings et al. | |
| 2010/0258493 A1 | 10/2010 | Kindkeppel et al. | |
| 2012/0060453 A1 | 3/2012 | Holzmann et al. | |
| 2012/0067014 A1 | 3/2012 | Dhiman et al. | |
| 2012/0181224 A1 | 7/2012 | Rapin | |
| 2013/0037478 A1 | 2/2013 | Thomas et al. | |
| 2013/0086877 A1 | 4/2013 | Kori et al. | |
| 2013/0263744 A1 | 10/2013 | Osendorf et al. | |
| 2014/0251895 A1 | 9/2014 | Wagner | |
| 2014/0260994 A1 | 9/2014 | Grider et al. | |
| 2015/0101298 A1 | 4/2015 | Osendorf et al. | |
| 2015/0292448 A1 | 10/2015 | Campbell et al. | |
| 2016/0074801 A1 * | 3/2016 | Francis | B01D 46/46 55/482 |
| 2016/0136562 A1 | 5/2016 | Nepsund et al. | |
| 2016/0332103 A1 | 11/2016 | Marks et al. | |
| 2017/0021291 A1 | 1/2017 | Morris et al. | |
| 2020/0238202 A1 * | 7/2020 | Renz | B01D 29/09 |
| 2021/0069631 A1 | 3/2021 | Neef et al. | |

FOREIGN PATENT DOCUMENTS

| | | |
|---|---|---|
| CN | 101048215 A | 10/2007 |
| CN | 201357024-7 | 12/2009 |
| CN | 101952010 | 1/2011 |
| CN | 102350151 A | 2/2012 |
| CN | 102527163 A | 7/2012 |
| CN | 103025405 A | 4/2013 |
| CN | 103442782 | 12/2013 |
| CN | 103635244 | 3/2014 |
| CN | 103732303 A | 4/2014 |

(56) References Cited

FOREIGN PATENT DOCUMENTS

| | | |
|---|---|---|
| CN | 103982343 A | 8/2014 |
| CN | 103987437 | 8/2014 |
| CN | 104028060 B | 9/2014 |
| CN | 104415619 | 3/2015 |
| CN | 104421062 | 3/2015 |
| CN | 104421063 A | 3/2015 |
| CN | 204419408 U | 6/2015 |
| CN | 204611988 U | 9/2015 |
| CN | 105263600 A | 1/2016 |
| CN | 105324572 A | 2/2016 |
| CN | 205173132 U | 4/2016 |
| CN | 105658944 A | 6/2016 |
| CN | 105840363 A | 8/2016 |
| CN | 106413841 | 2/2017 |
| CN | 206381744 U | 8/2017 |
| CN | 207445816 U | 6/2018 |
| CN | 109906109 A | 6/2019 |
| CN | 111757776 B | 10/2020 |
| DE | 10 2014 012 948 | 6/2015 |
| DE | 10 2016 000 575 A1 | 8/2016 |
| EP | 0 723 800 | 7/1996 |
| EP | 1 769 835 A2 | 4/2007 |
| EP | 2 227 306 B1 | 9/2010 |
| EP | 2 742 986 A1 | 6/2014 |
| JP | H06-085007 U | 12/1994 |
| TW | 428670 | 4/2001 |
| WO | WO-02/31340 | 4/2002 |
| WO | WO-2004/039476 A1 | 5/2004 |
| WO | WO-2006/026241 A1 | 3/2006 |
| WO | WO-2008/124437 | 10/2008 |
| WO | WO-2009/019443 | 2/2009 |
| WO | WO-2016/040016 A1 | 3/2016 |
| WO | WO-2017/079191 A1 | 5/2017 |
| WO | WO-2018/156489 A1 | 8/2018 |
| WO | WO-2019/018465 A1 | 1/2019 |
| WO | WO-2019/140045 | 7/2019 |

OTHER PUBLICATIONS

Non-Final Office Action on U.S. Appl. No. 18/132,056 issued Nov. 6, 2023.
International Search Report and Written Opinion for PCT Application No. PCT/US2020/059838, dated Mar. 18, 2021.
First Office Action issued for Chinese Patent Application No. 202210037902.7, issued Dec. 9, 2023, 5 pages.
Office Action issued for Indian Patent Application No. issued Dec. 19, 2022, 6 pages.
Office Action issued for Chinese Patent Application No. CN 2018800481949 issued Apr. 28, 2021, 13 pages.
International Search Report and Written Opinion issued for PCT/US2018/042589, issued Sep. 25, 2018, 14 pages.
Office Action issued for U.S. Appl. No. 16/631,974 issued Aug. 19, 2021, 10 pages.
First Examination Report for Indian Patent Application No. 2835/KOLNP/2012 dated Jul. 17, 2018, 9 pages.
Fist Office Action for Chinese Patent App. No. 201180030354.5 dated Apr. 18, 2014, 36 pages (with translation).
Foreign Action other than Search Report on CN 201980012052.1 DTD Jun. 25, 2021.
International Search Report and Written Opinion for PCT Application No. PCT/US2021/026608 issued Sep. 1, 2021.
International Search Report & Written Opinion for PCT/US11/51880 dated Feb. 2, 2012, 7 pages.
International Search Report and Written Opinion issued for PCT/US2019/012985, issued Mar. 27, 2019, 10 pages.
Non-Final Office Action on U.S. Appl. No. 16/961,176 DTD Mar. 17, 2022.
Office Action for Brazilian Patent App. No. 1120120252518 dated Feb. 12, 2019, 8 pages (with translation).
Office Action for U.S. Appl. No. 13/234,309 dated Jan. 27, 2014, 11 pages.
Office Action for U.S. Appl. No. 14/453,084 dated Jan. 14, 2016, 7 pages.
First Office Action issued for Chinese Patent Application No. 202080075668.6 issued Jun. 5, 2023, 11 pages.
Second Office Action issued for Chinese Patent Application No. 202080075668.6 issued Jan. 18, 2024, 10 pages.
Second Office Action issued for Chinese Patent Application No. 202180027209.5 issued Feb. 1, 2024.
Supplemental Search Report issued for European Patent Application No. 21789544.0, issue Jul. 31, 2024.
Partial Supplementary European Search Report issued for European Patent Application No. 21789544.0, issued May 7, 2024.
Office Action issued for Chinese Patent Application No. 202080075668.6 issued Apr. 24, 2024.

* cited by examiner

LOW RESTRICTION AIR FILTER

CROSS-REFERENCE TO RELATED APPLICATIONS

This application is the U.S. national stage of PCT Application No. PCT/US2020/059838, filed Nov. 10, 2020, which claims the benefit of and priority to U.S. Provisional Application No. 62/936,774, filed on Nov. 18, 2019, the contents of which are incorporated herein by reference in their entirety.

TECHNICAL FIELD

The present invention relates generally to filter assemblies for filtering fluids in internal combustion engine systems.

BACKGROUND

Air cleaners are often used to filter air in air intake systems of devices, such as internal combustion engines. Air cleaners include a housing extending along an axis and having at least one sidewall extending between first and second axial ends, where the sidewall includes an air inlet receiving dirty incoming air. One of the axial ends of the housing includes an outlet discharging clean filtered air. An air filter element is typically axially insertable into the housing through an open axial end. Pressure loss across an air cleaner is a critical performance characteristic, with lower pressure loss being more desirable, as the amount of wasted energy is reduced.

SUMMARY

According to one embodiment, an air cleaner system is provided. The air cleaner system includes a housing having a first housing end with an opening, a second housing end, and an inlet proximate the second housing end. The air cleaner system also includes a filter element removably installed within the housing through the opening, the filter element including filter media, a first endplate coupled to the filter media at a first filter end, an open second endplate coupled to the filter media at a second filter end, and an annular projection extending axially from the open second endplate. The annular projection seals against the housing and creates an axial gap between the filter element and the housing. Fluid entering the housing through the inlet flows into the axial gap.

According to another embodiment, an axial load filter element is provided. The axial load filter element includes filter media, a closed first endplate coupled to the filter media at a first filter end and having a handle assembly, an open second endplate coupled to the filter media at a second filter end, and an annular projection extending axially from the open second endplate. The annular projection has an annular projection diameter of less than 90% of a filter media outer diameter.

According to another embodiment, an air cleaner system is provided. The air cleaner system includes a housing and a filter element removably installed within the housing. The housing includes a first housing end, a second housing end, an inlet proximate to the second housing end, and a cover. The cover is removably coupled to the body of the housing proximate to the first housing end. The cover includes an outer cover surface and an inner cover surface radially separated by a cover thickness. The inner cover surface defines a cover opening. The filter element is inserted into the housing via the cover opening. The filter element includes filter media, a first endplate coupled to the filter media at a first filter end, and an open second endplate coupled to the filter media at a second filter end. An annular projection extends axially from the open second endplate in a direction away from the first endplate. The annular projection may be formed of a compliant material configured to form a substantially liquid-tight seal with the housing proximate to the second housing end.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, an air cleaner system is described. The air cleaner system includes a cylindrical air filter element used in a tangential inlet air cleaner housing. The air cleaner housing includes a first axial end and a second axial end, where the first axial end includes an opening to receive the filter element. The filter element may be positioned within the air cleaner housing and is accessible through the open first axial end of the air cleaner system. An endplate of the filter element includes a handle and a latch configured to engage the air cleaner housing when the filter element is in an installed position. By grasping the handle, a user can use a single hand to release the latch from the air cleaner housing and easily remove the filter element in an axial direction, for example for servicing or replacement purposes. The filter element is cylindrical, and the air cleaner housing includes a tangential inlet. The filter element includes an open endcap and a closed endcap. A portion of the open endcap side of the filter element is offset from the second axial end of the air cleaner housing. This offset creates an axial gap between the air cleaner housing and the filter element, thereby providing additional flow area resulting in lower pressure drop than conventional filters.

Referring to FIGS. 1-5, the air cleaner system 100 is shown, according to an example embodiment. The air cleaner system 100 includes a housing 102 extending axially along a longitudinal axis 115 and having an annular sidewall 105 extending between a first end 101 and a second end 103. The annular sidewall 105 includes an air inlet 106 configured to direct air into the housing 102 substantially along inlet direction 112 and an air outlet 108 configured to discharge clean filtered air out of the housing 102 substantially along outlet direction 114. Inlet direction 112 is substantially tangential to the outer surface of the filter element 110 positioned within the housing 102. The air inlet 106 and the air outlet 108 are both positioned proximate the second end 103 of the housing 102. The housing 102 includes a cover 104 coupled to the first end 101. In some embodiments, the cover 104 is removably coupled to the rest of the housing 102. For example, the cover 104 may be coupled to the rest of the housing 102 with latches, fasteners, threads, adhesives, bayonet latches, clips, or similar couplings. The cover 104 is open at the first end 101 to enable replacement and servicing of the filter element 110 without removing the cover 104 from the rest of the housing 102. In other embodiments, the cover 104 is a closed cover such that the cover 104 must be removed to enable replacement and servicing of the filter element 110. In some embodiments, the cover 104 is permanently coupled to the rest of the housing 102 such that the cover 104 may not be removed from the rest of the housing 102 without damage to at least one of the cover 104 and/or another portion of the housing 102. In some embodiments, the cover 104 is integrally formed with a body of the housing 102 such that the cover 104 and the body of the housing 102 are formed together as a single unit. In some embodiments, the cover 104 and the body of the housing 102 are formed of different materials. For example, the body of the housing 102 may be formed of metal and the cover 104 may be formed of plastic.

Figure 5:
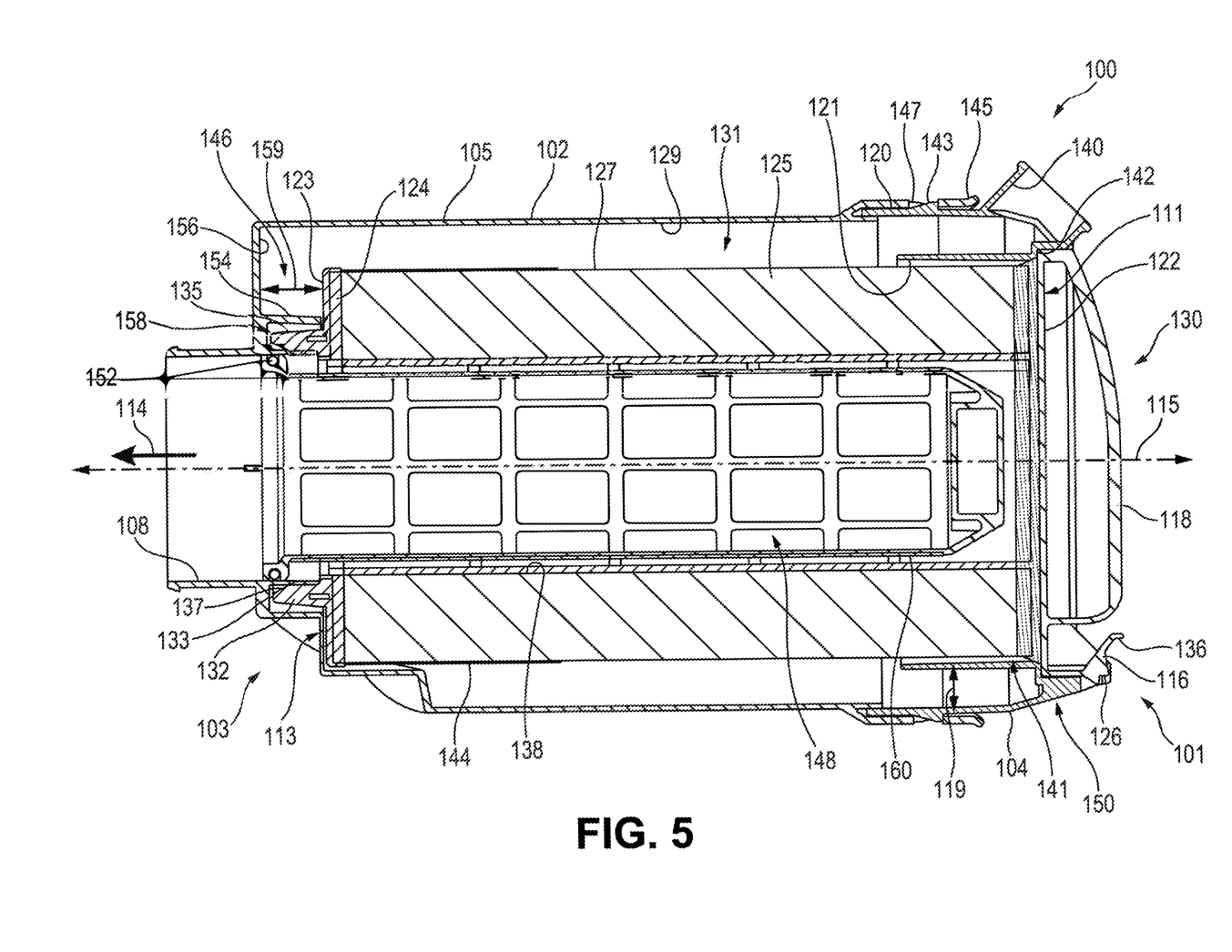
FIG. 5 shows a side section view of the air cleaner system of FIG. 1.

The cover 104 defines a substantially annular body having a doughnut-shaped cross-sectional shape when cut perpendicularly to the longitudinal axis 115. When the cover 104 is coupled to the rest of the housing 102, the cover 104 is centered on the longitudinal axis 115. In some embodiments, the cover 104 is concentric about the longitudinal axis 115 when the cover 104 is coupled to the rest of the housing 102. The cover 104 defines a substantially annular outer cover surface 120 and a substantially annular inner cover surface 121 (FIG. 5). The outer cover surface 120 and the inner cover surface 121 may be separated by a radial distance, shown as a cover thickness 119. The cover thickness 119 facilitates positioning of the filter element 110 away from a housing inner surface 129. Positioning the filter element 110 away from the housing inner surface 129 allows fluid to flow between the housing 102 and the filter element 110. In some embodiments, a radial distance between the filter element 110 and the housing 102 (e.g., between an outer surface 127 of the filter element 110 and the housing inner surface 129) is greater than the cover thickness 119.

The inner cover surface 121 defines a cover opening 141 configured to receive the filter element 110. In some embodiments, the inner cover surface 121 interfaces with the filter element 110. In some embodiments, the inner cover surface 121 is positioned away from the filter element 110 such that fluid (e.g., air) may flow between the filter element 110 and the inner cover surface 121. Extending away from the inner cover surface 121 in a radial direction toward the outer cover surface 120 may be a cover flange 142 (FIG. 5). The cover flange 142 interfaces with a portion of the filter element 110 to facilitate positioning of the filter element 110 within the housing 102. In some embodiments, the filter element 110 cooperates with the cover flange 142 to form a sealing engagement such that fluid cannot flow out of the cover opening 141. In some embodiments, the filter element 110 cooperates with the inner cover surface 121 to form a sealing engagement to prevent fluid from flowing out of the cover opening 141.

Extending radially away from the outer cover surface 120 may be a cover projection 143 configured to be received within a latch member 145 extending axially away from the body of the housing 102 in a direction away from the air outlet 108. The latch member 145 includes a latch opening 147 that extends through the latch member 145 and is configured to receive the cover projection 143. The cover projection 143 cooperates with the latch member 145 to removably couple the cover 104 to the rest of the housing 102.

The housing 102 further includes a dust evacuator port 140. In some embodiments, the dust evacuator port 140 extends away from the cover 104. The dust evacuator port 140 is in fluid communication with a fluid channel positioned between the outer cover surface 120 and the inner cover surface 121. In some embodiments, the dust evacuator port 140 includes a valve. In some embodiments, the dust evacuator port 140 is fluidly coupled to aspiration ducting which facilitates the removal of debris (e.g., dirt, dust, etc.) from within the housing 102.

Referring to FIGS. 5-10, the air cleaner system 100 includes a filter element 110. The filter element 110 is disposed in the housing 102 and extends axially between a first element axial end 111 adjacent the first end 101 of the housing 102 and second element axial end 113 adjacent to the second end 103 of the housing 102. In some embodiments, a portion of the first endplate 122 engages with the cover 104 to form a sealing engagement. The first endplate 122 is closed and the second endplate 124 is open. The filter element 110 includes filter media 125 arranged in a cylindrical manner with an inner surface 138 defining a clean air outlet channel 148. The filter media 125 extends between the first endplate 122 and the second endplate 124. An annular dirty air inlet channel 131 is defined between the outer surface 127 of the filter media 125 and the housing inner surface 129. The dirty air inlet channel 131 extends into the cover 104 (e.g., between the outer cover surface 120 and the inner cover surface 121) and the dirty air inlet channel 131 is in fluid communication with the dust evacuator port 140.

In operation, dirty air enters the air cleaner system 100 through air inlet 106 in inlet direction 112, into the annular dirty air inlet channel 131 and through the filter media 125 in an outside-in direction. The cleaned air flows from through the clean air outlet channel 148 and through the air outlet 108 in outlet direction 114.

Figure 6:
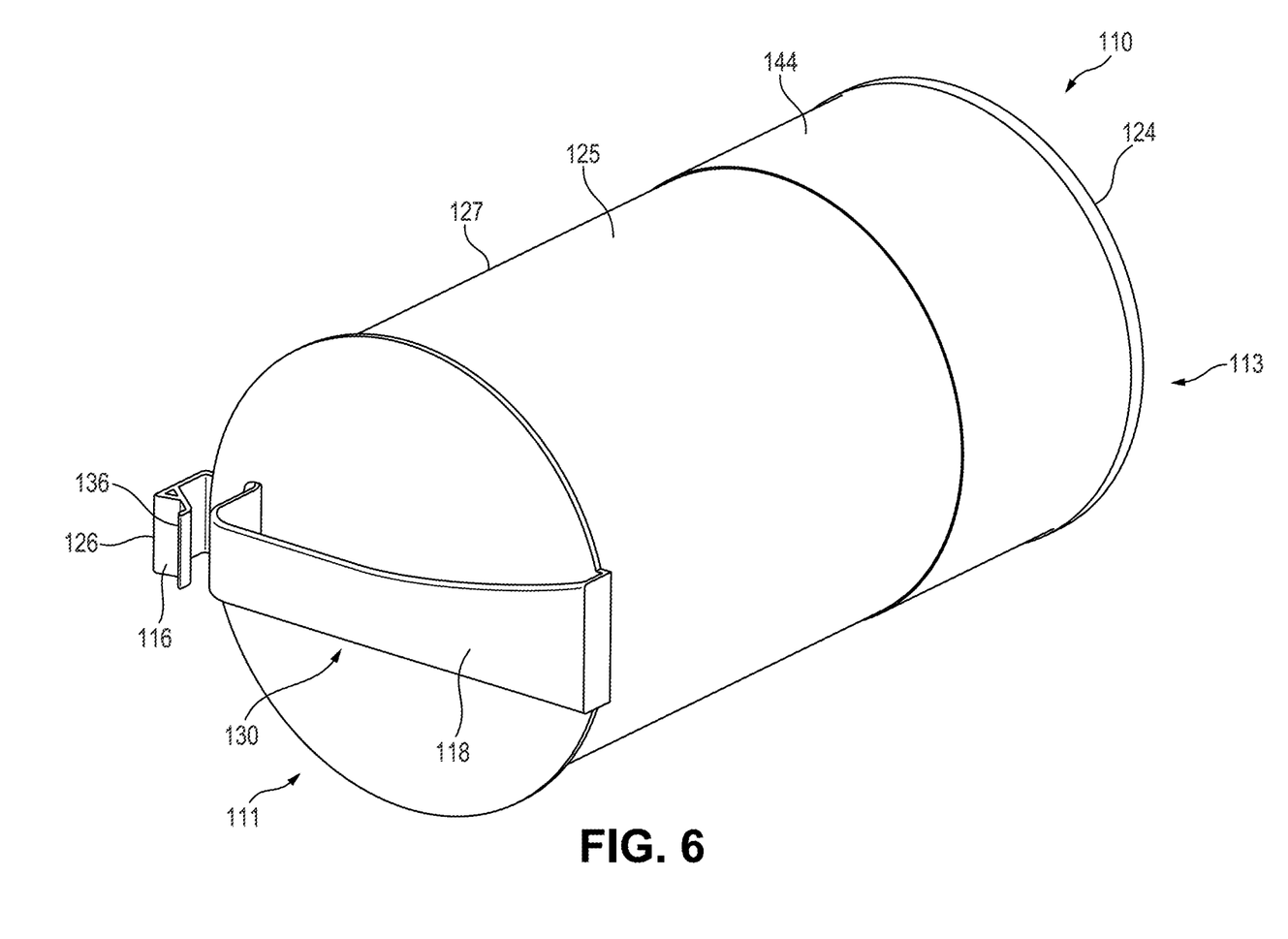
FIG. 6 shows a front perspective view of a filter element for use with the air cleaner system of FIG. 1, according to an example embodiment.
Figure 7:
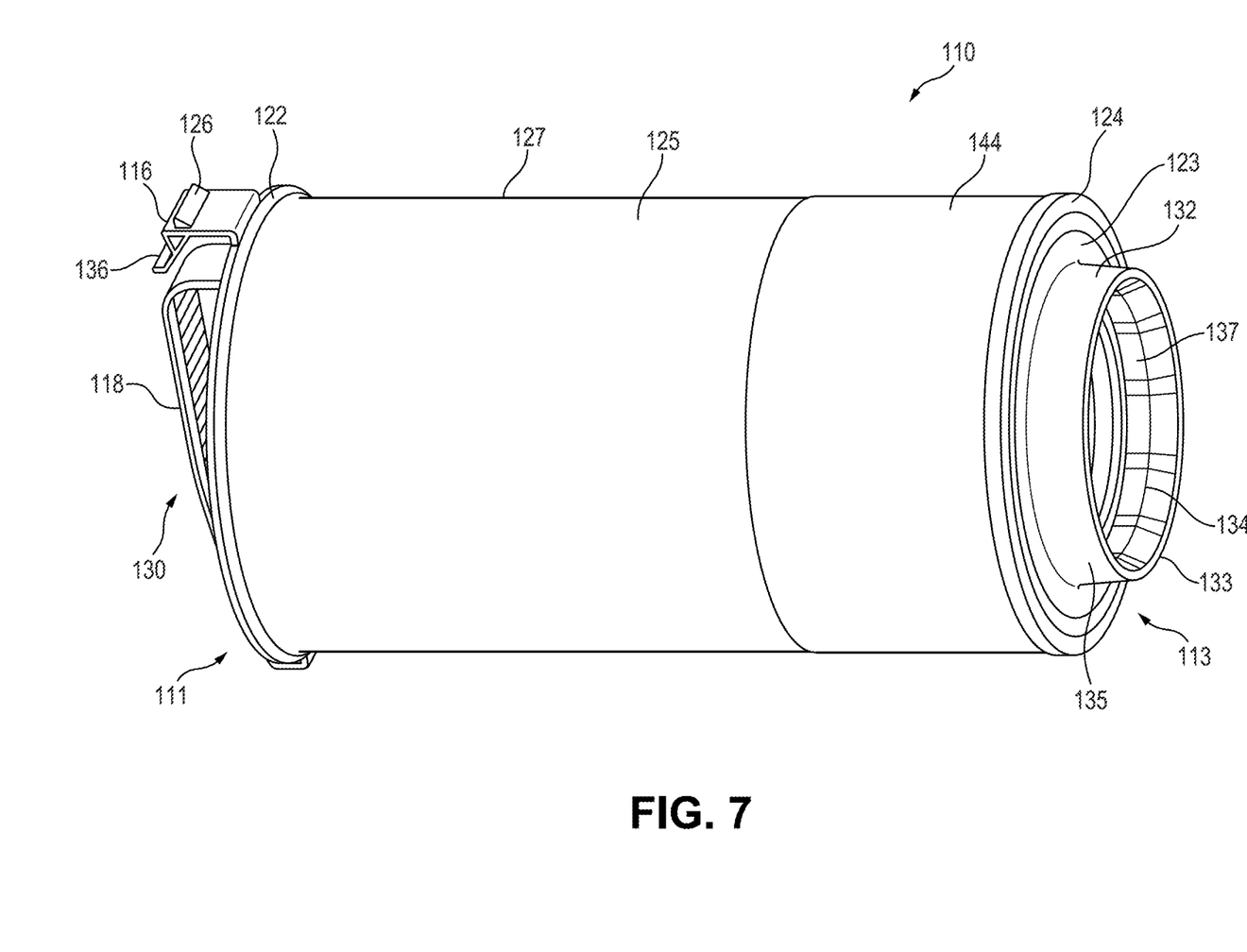
FIG. 7 shows a rear perspective view of the filter element of FIG. 6.
Figure 8:
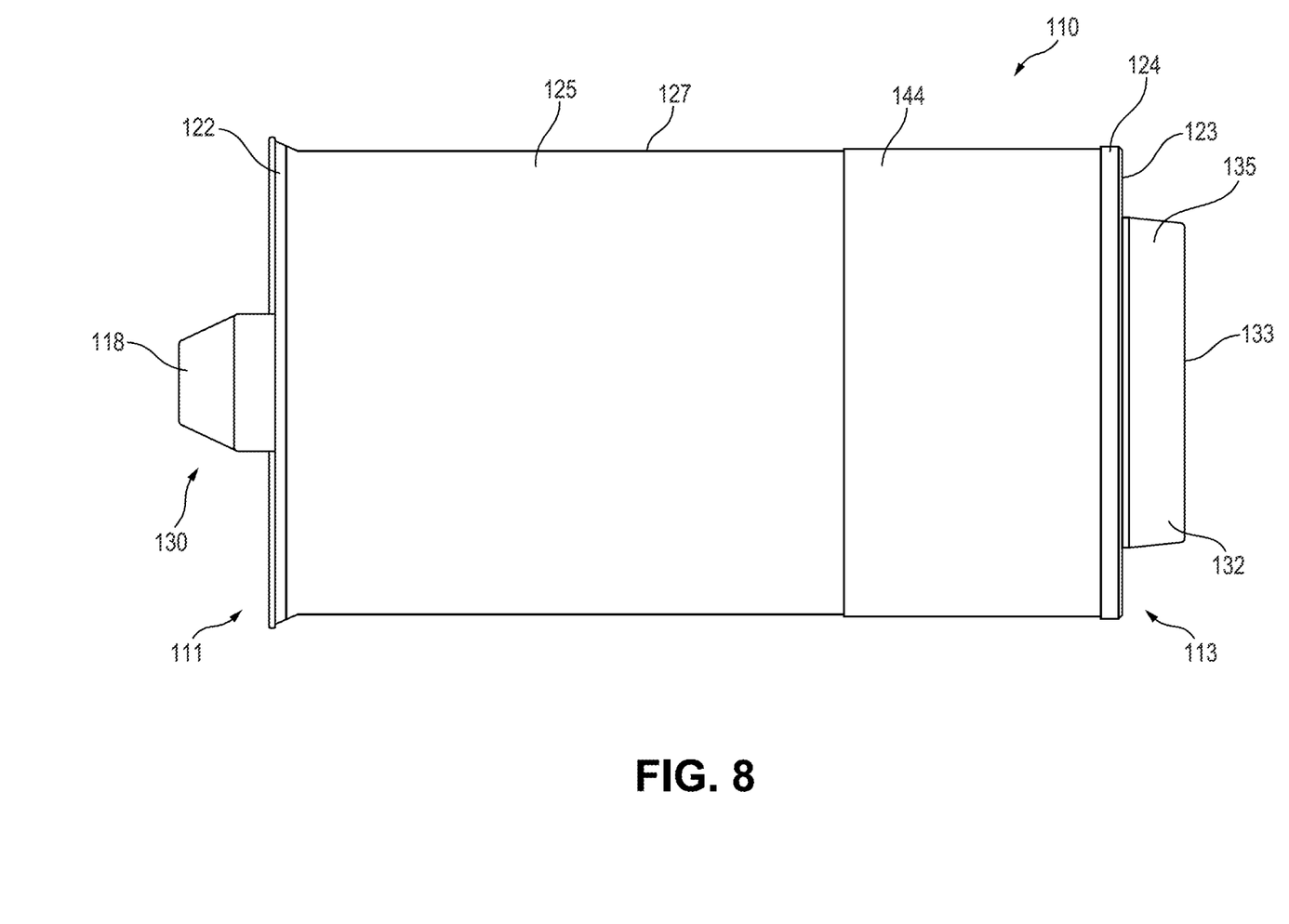
FIG. 8 shows a side view of the filter element of FIG. 6.

Referring to FIGS. 6-8, the first endplate 122 includes a handle assembly 130 configured to enable insertion and removal of the filter element 110 to and from the housing 102 through the cover opening 141. The filter element 110 is axially insertable into the housing 102 through the first end 101 (e.g., within the opening formed in the cover 104, within the cover opening 141). A user can access and service the filter element 110 through the cover opening 141. The handle assembly 130 is formed as an integral piece with the first endplate 122. The handle assembly 130 includes a handle member 118 and a latch member 116. The latch member 116 includes a tab 126 which interacts with an aperture 128 of the housing 102 to lock the filter element 110 into place within the housing 102. The tab 126 extends away from the latch member 116 in a direction away from the longitudinal axis 115. The aperture 128 extends through a second cover flange 150 that extends axially away from the housing 102. In some embodiments, the second cover flange 150 extends away from the cover 104 in a direction away from the first end 101 of the housing 102. The second cover flange 150 engages with the latch member 116 to retain the filter element 110 within the housing 102.

The latch member 116 also includes a grip member 136. The latch member 116 is flexible in nature such that the user can press downward on the grip member 136 to release the tab 126 from the aperture 128 and pull the filter element 110 using handle member 118 in an axial direction (e.g., along longitudinal axis 115) out of the housing 102.

Figure 1:
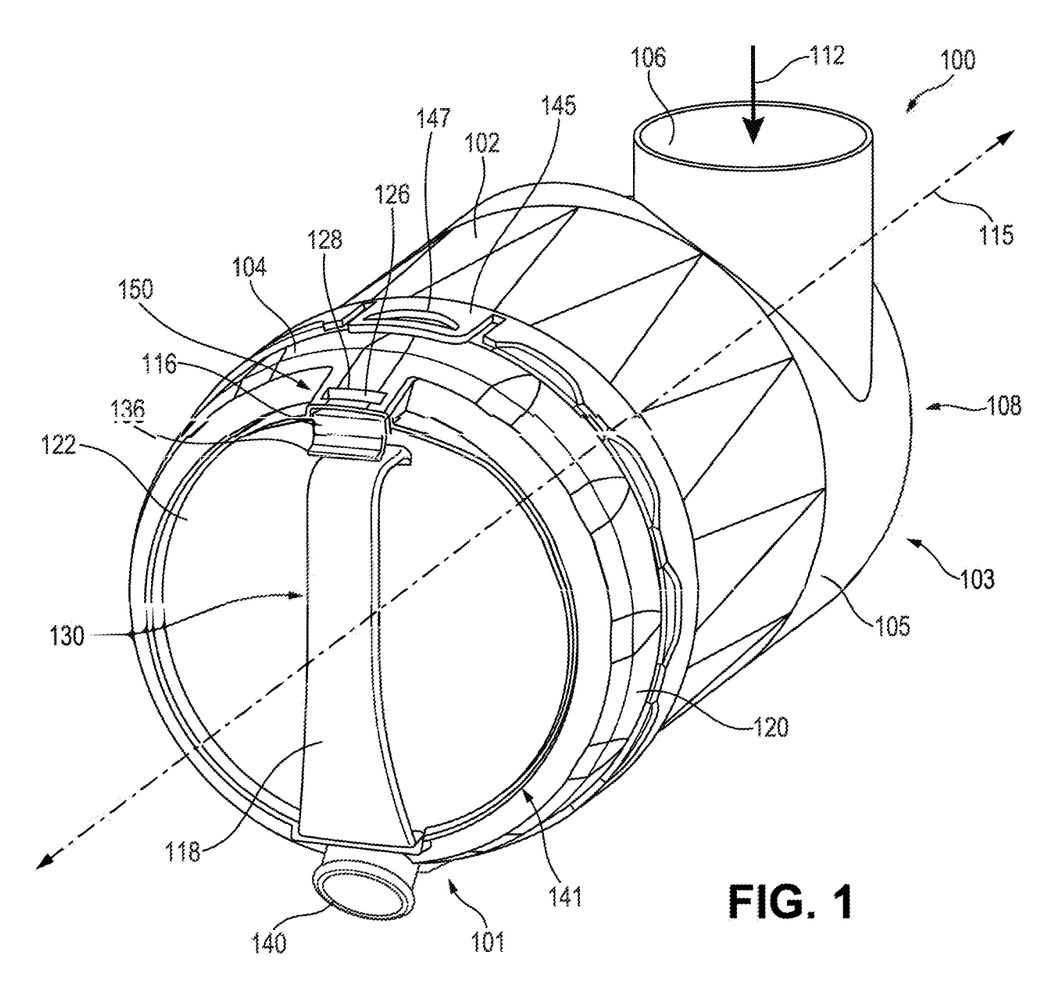
FIG. 1 shows a front perspective view of an air cleaner system, according to an example embodiment.
Figure 2:
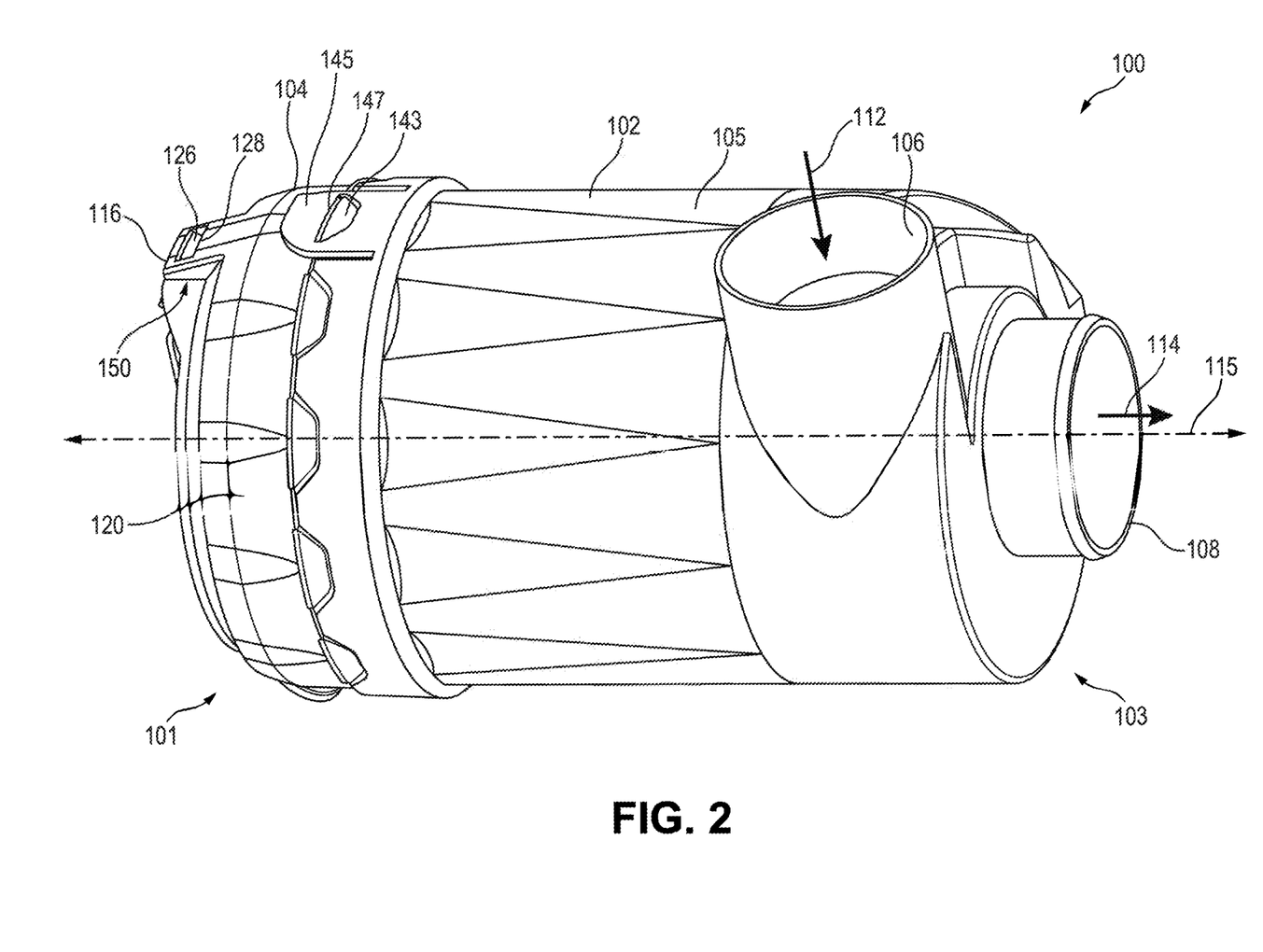
FIG. 2 shows a rear perspective view of the air cleaner system of FIG. 1.
Figure 3:
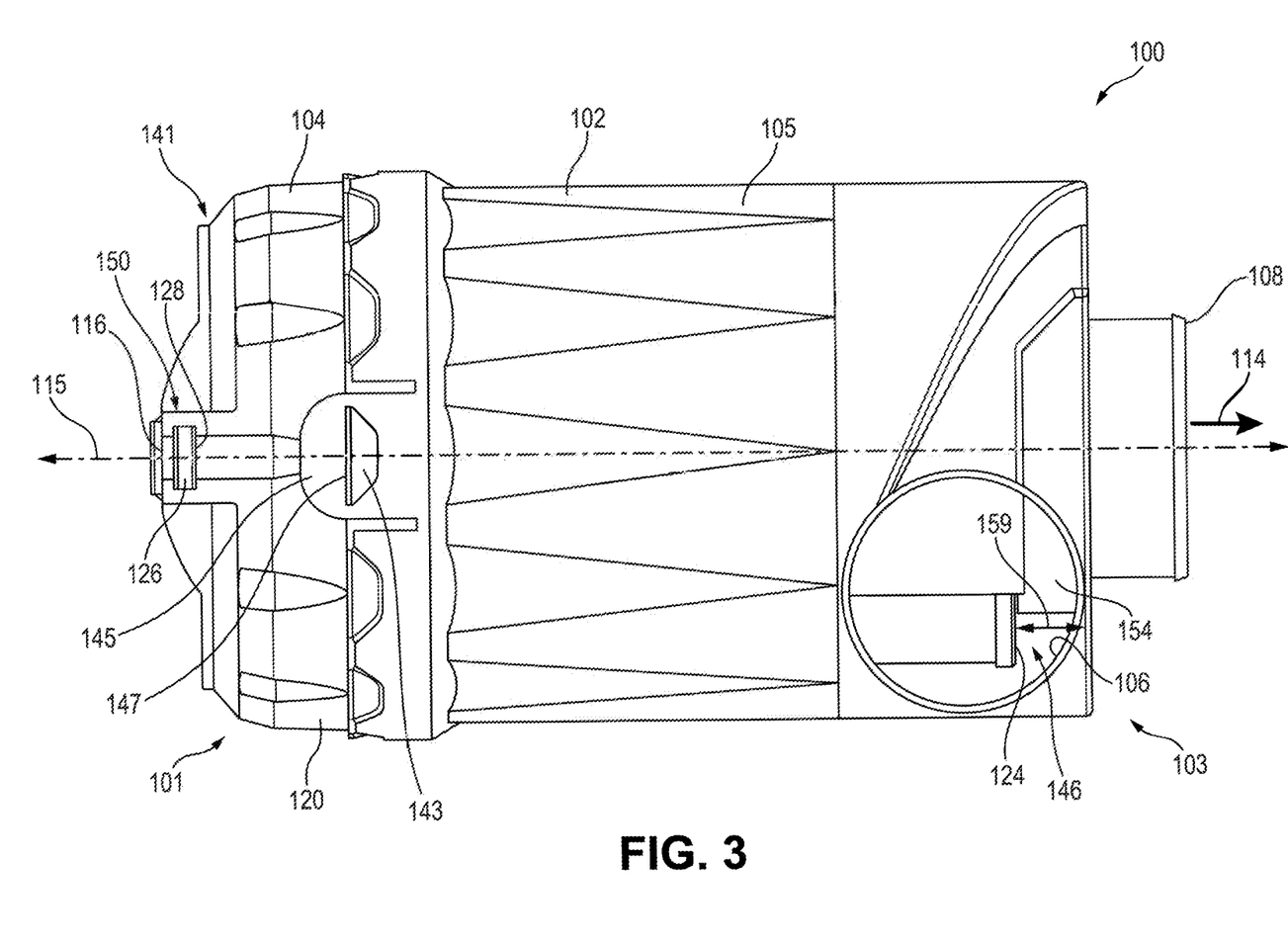
FIG. 3 shows a top view of the air cleaner system of FIG. 1.
Figure 4:
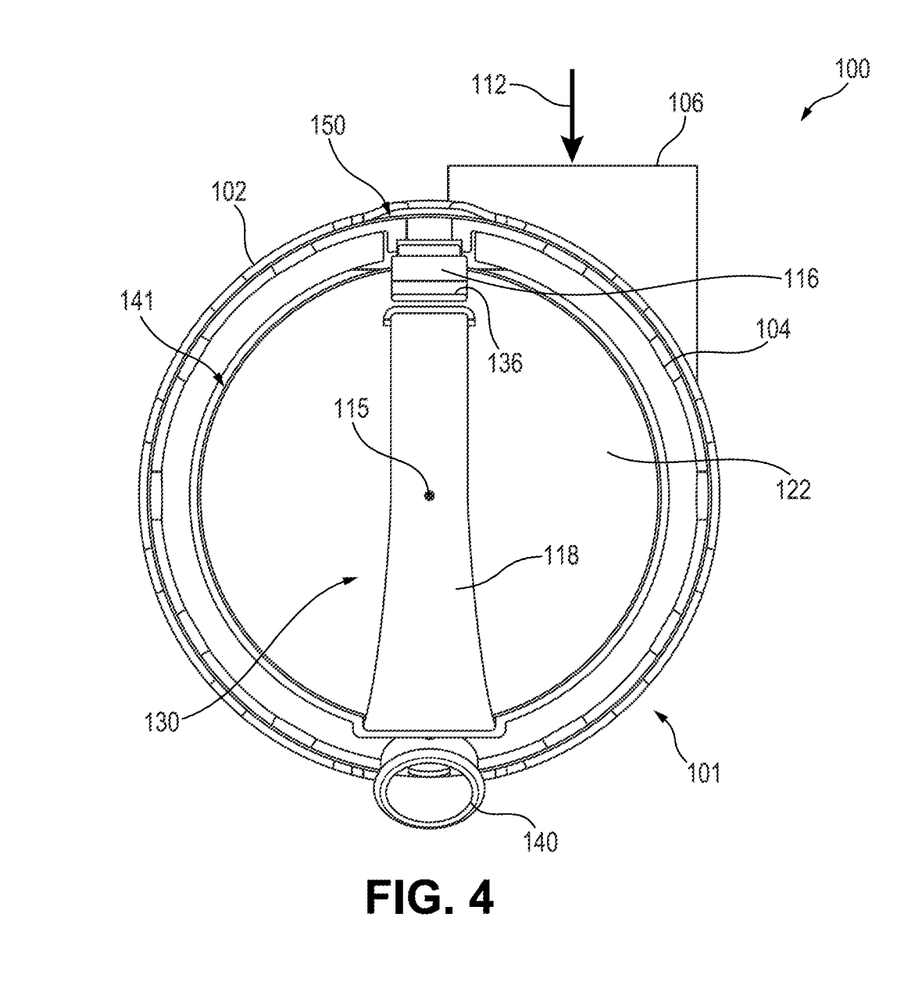
FIG. 4 shows a front view of the air cleaner system of FIG. 1.

Referring to FIGS. 3 and 5, the filter element 110 includes a ring-shaped, annular projection 132 extending axially (e.g., along longitudinal axis 115) from a second endplate end face 123 of the second endplate 124 at a second element axial end 113 of the filter element 110. The annular projection 132 extends from the second endplate end face 123 and terminates at an annular projection end face 133. The annular projection 132 includes a radial outer surface 135 and a radial inner surface 137, both the radial outer surface 135 and the radial inner surface 137 extending between the second endplate end face 123 to the annular projection end face 133. The annular projection 132 is positioned proximate the second end 103 of the housing 102 such that the annular projection 132 is also positioned proximate both the air inlet 106 and the air outlet 108 of the housing 102. The annular projection 132 is positioned radially outward of the air outlet 108 of the housing 102 (e.g., relative to the longitudinal axis 115 of the housing 102) when the filter element 110 is in an installed position within the housing 102. The annular projection 132 is also positioned radially inward of the air inlet 106 of the housing 102. The annular projection 132 is centered around the longitudinal axis 115 and positioned between the second endplate 124 and the housing inner surface 129. The annular projection 132 seals against the housing inner surface 129 at the second end 103 of the housing 102 when the filter element 110 is in an installed position within the housing 102. The annular projection end face 133 abuts and seals against the housing inner surface 129 of the housing 102. The radial outer surface 135 of the annular projection 132 abuts and seals against the housing inner surface 129.

Figure 9:
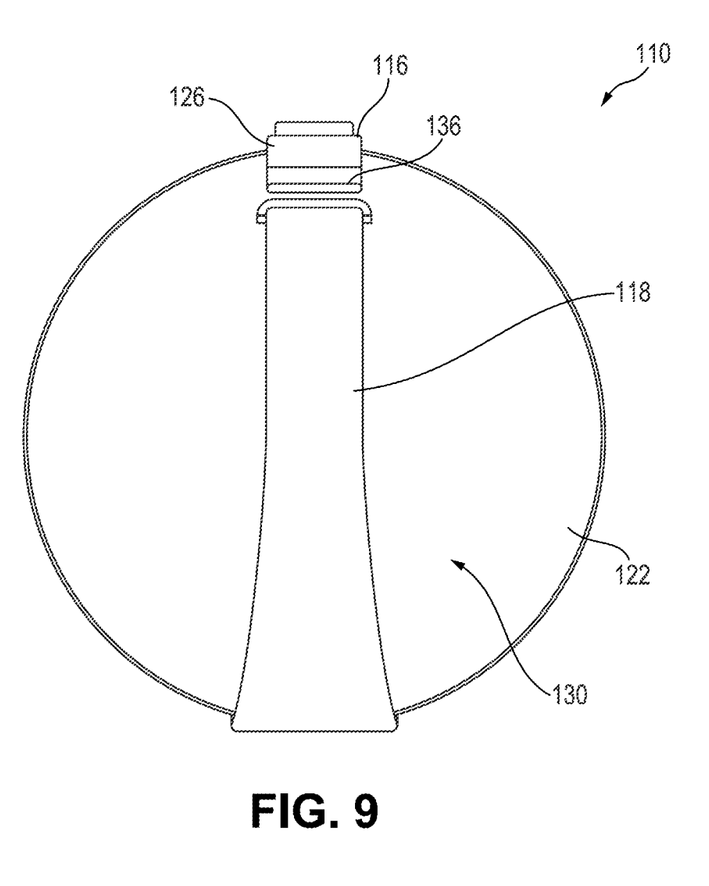
FIG. 9 shows a front view of the filter element of FIG. 6.
Figure 10:
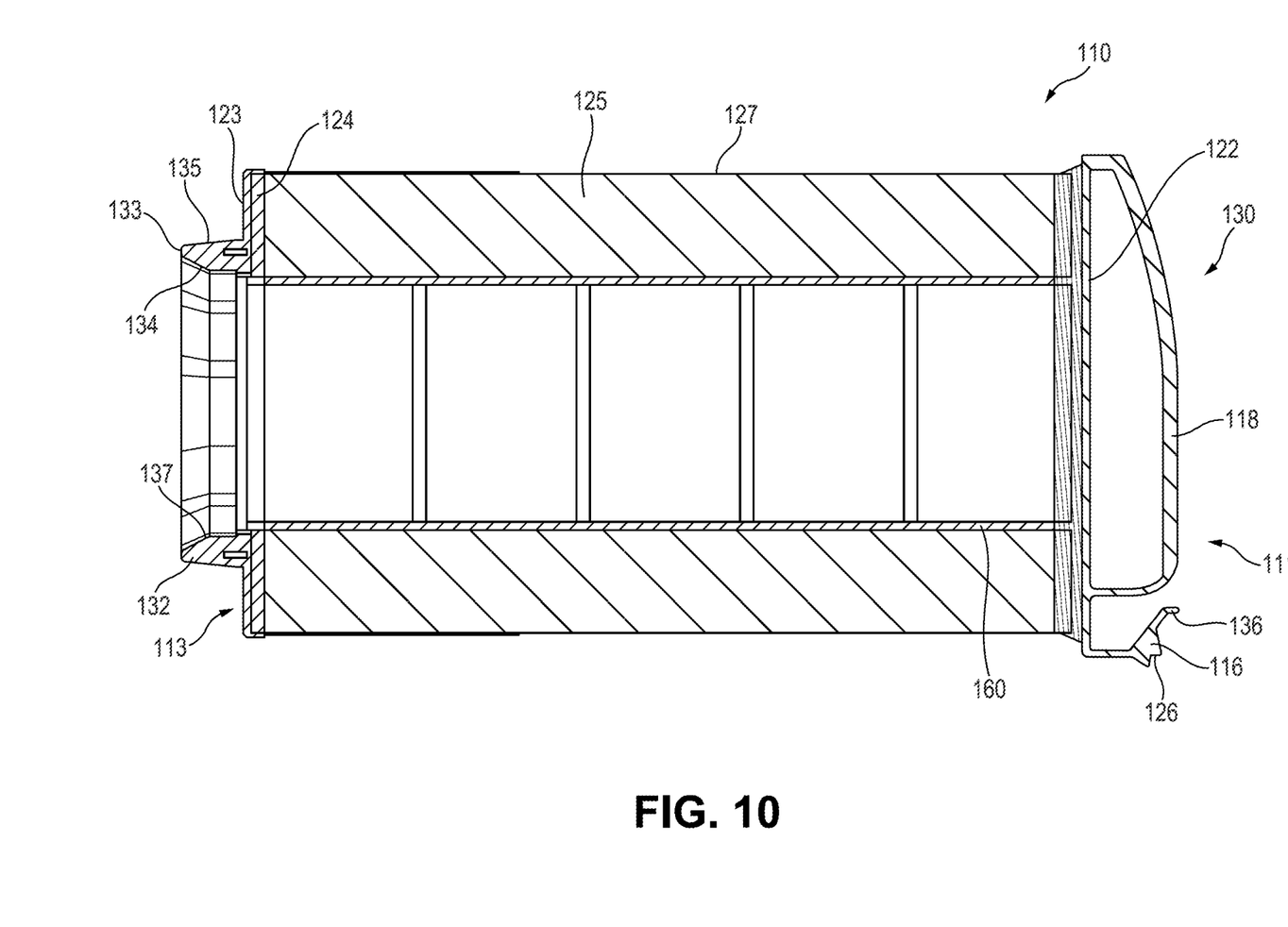
FIG. 10 shows a side section view of the filter element of FIG. 6.

Referring to FIGS. 7 and 9, the annular projection 132 includes chords 134 inscribed in the annular projection 132 (e.g., on the inner radial sealing surface of the filter element 110). In some embodiments, the annular projection 132 has a diameter that is approximately 90% of the diameter of the second endplate 124 (e.g., approximately 90% of the filter media outer diameter/approximately 90% of the diameter of outer surface 127 of the filter media 125). In some embodiments, the annular projection 132 has a diameter that is 90% or less of the diameter of the second endplate 124 (e.g., 90% or less than the filter media outer diameter/90% or less than the diameter of outer surface 127 of the filter media 125). In some embodiments, the annular projection 132 has a length (e.g., axial length) of at least 10 millimeters. In some embodiments, the annular projection 132 has a length (e.g., axial length) of at least 25 millimeters or approximately 5% of the total length of the filter element 110.

A ring-shaped housing projection 154 extends away from the second end 103 of the housing 102 in a direction toward the first end 101. The housing projection 154 extends away from a second inner end surface 156 of the housing 102. The housing projection 154 is positioned about the longitudinal axis 115 and defines a diameter greater than the diameter of the annular projection 132. The housing projection 154 and the air outlet 108 cooperate to define an annular housing cavity 158 configured to receive the annular projection 132.

The housing projection 154 may interface with the second endplate 124 to position the second endplate 124 away from the housing inner surface 129, and more specifically away from the second inner end surface 156.

The annular projection 132 creates an axial gap 146 between the radially outermost portion of the filter element 110 and the housing 102. The axial gap 146 is formed between the second endplate 124 and the second inner end surface 156. A gap width 159 is defined as a distance between the second endplate 124 and the second inner end surface 156. The axial gap 146 is positioned within the incoming air flow (shown by inlet direction 112) proximate the air inlet 106 of the housing 102. Accordingly, the incoming air flow entering the housing 102 through air inlet 106 enters into the axial gap 146 between the second end of the filter element 110 (e.g., the second endplate 124) and the housing inner surface 129 of the housing 102 (e.g., the second inner end surface 156). The axial gap 146 creates additional flow area for the incoming air flow. By creating the additional flow area, the pressure drop is decreased.

The filter element 110 is sealed (e.g., radially sealed, axially sealed) against the housing 102 (e.g., in air outlet 108) using one or more seal members. In various embodiments, different types of seals can be formed in the air cleaner system 100 described herein. Various types of seals can include axial, radial, elliptical, etc. In some embodiments, the annular projection 132 includes a sealing member. In some embodiments, the annular projection 132 is formed of a compliant material configured to be compressed within the housing cavity 158 and form a sealing engagement with at least one of the housing projection 154 and the air outlet 108. The air cleaner system 100 may include a secondary filter element 160. The secondary filter element 160 may include a seal member 152 configured to form an axial seal with the air outlet 108. In some embodiments, the filter element 110 includes a permeable baffle 144 (e.g., mesh wrap) positioned on an outer surface 127 of the filter media 125. The permeable baffle 144 surrounds the filter media 125 near the air inlet 106 of the air cleaner system 100. In some embodiments, the permeable baffle 144 includes an average pore size between approximately 20 micrometers and 200 micrometers. In some embodiments, the filter element 110 includes an integrated center tube and in some embodiments, the first endplate 122 is separate from the center tube.

Figure 11:
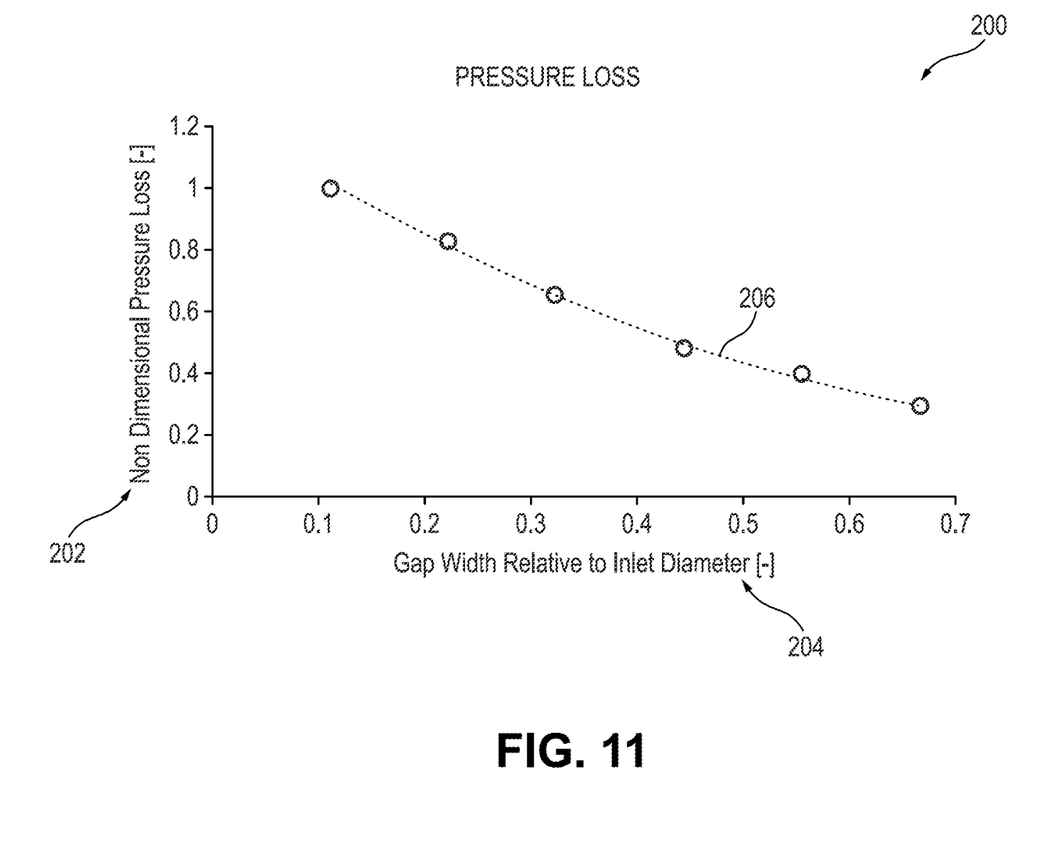
FIG. 11 shows a graph of non-dimensional pressure loss plotted against gap width relative to inlet diameter.

Referring to FIG. 11, a graph 200 of non-dimensional pressure loss 202 plotted against the gap width 159 relative to the inlet diameter 204 is shown. As illustrated by the plotted line 206, as the gap width 159 relative to the inlet diameter 204 increases, the non-dimensional pressure loss 202 decreases. Thus, by creating the axial gap 146 as described herein, the pressure loss for the air cleaner system 100 has been decreased. For example, as shown in FIG. 3, the gap width 159 is approximately 33% of the diameter of the inlet 106. Referring to the graph 200, the non-dimensional pressure loss would be approximately 0.65.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure. Further, the formation of a passage by one or more surfaces can comprise a wide variety of passage cross-sectional shapes, for example, passages having circular, rectangular, oval, etc. cross-sectional shapes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications to the flow structures are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. An air cleaner system comprising:
 a housing comprising a first housing end having an opening, a second housing end, and an inlet proximate the second housing end; and
 a filter element removably installed within the housing through the opening, the filter element comprising:
  filter media;
  a first endplate coupled to the filter media at a first filter end;
  an open second endplate coupled to the filter media at a second filter end; and
  an annular projection extending axially from the open second endplate in a direction away from the first endplate, the annular projection comprising chords on a radial inner surface thereof, the annular projection sealing against the housing and creating an axial gap between a radially outermost portion of the filter element and the housing proximate the inlet;
 wherein fluid entering the housing through the inlet flows into the axial gap.

2. The air cleaner system of claim 1, wherein the inlet is tangential to the radially outermost portion of the filter element.

3. The air cleaner system of claim 1, wherein the first endplate comprises a handle assembly comprising a handle member and a latch, the latch engaging with an aperture formed in the housing to retain the filter element within the housing.

4. The air cleaner system of claim 1, wherein the annular projection comprises an annular projection outer diameter and the filter media comprises a filter media outer diameter, the annular projection outer diameter less than 90% of the filter media outer diameter.

5. The air cleaner system of claim 1, wherein the annular projection comprises an annular projection length of at least 10 millimeters.

6. An air cleaner system comprising:
 a housing comprising a first housing end having an opening, a second housing end, and an inlet proximate the second housing end; and
 a filter element removably installed within the housing through the opening, the filter element comprising:
  filter media;
  a first endplate coupled to the filter media at a first filter end;
  an open second endplate coupled to the filter media at a second filter end; and
  an annular projection extending axially from the open second endplate in a direction away from the first endplate, the annular projection sealing against the housing and creating an axial gap between a radially outermost portion of the filter element and the housing proximate the inlet;
 wherein fluid entering the housing through the inlet flows into the axial gap; and
 wherein the first endplate extends out of the opening of the first housing end.

7. An air cleaner system comprising:
 a housing comprising a first housing end having an opening, a second housing end, an inlet proximate the second housing end, and a cover removably coupled to the housing proximate to the first housing end and defining the opening; and
 a filter element removably installed within the housing through the opening, the filter element comprising:
  filter media;
  a first endplate coupled to the filter media at a first filter end;
  an open second endplate coupled to the filter media at a second filter end; and
  an annular projection extending axially from the open second endplate in a direction away from the first endplate, the annular projection sealing against the housing and creating an axial gap between a radially outermost portion of the filter element and the housing proximate the inlet, wherein:
   fluid entering the housing through the inlet flows into the axial gap, and
   the filter element extending through the cover when:
    the cover is coupled to the first housing end; and
    the filter element is positioned within the housing.

8. The air cleaner system of claim 7, wherein:
the first endplate comprises a handle assembly comprising a handle member, a latch, and a tab extending away from the latch; and
the cover comprises a cover flange extending axially away from the cover in a direction away from the second housing end, the cover flange comprising an aperture configured to receive the tab to retain the filter element within the housing.

9. The air cleaner system of claim 7, wherein the filter element is engageable with the cover to form a substantially liquid-tight sealing engagement.

10. An axial load filter element comprising:
filter media;
a closed first endplate coupled to the filter media at a first filter end and comprising a handle assembly;
an open second endplate coupled to the filter media at a second filter end; and
an annular projection extending axially from the open second endplate and comprising chords on a radial inner surface of the annular projection, the annular projection having an annular projection diameter of less than 90% of a filter media outer diameter of the filter media.

11. The axial load filter element of claim 10, wherein the handle assembly comprises a handle member and a latch, the latch engaging with an aperture formed in a housing to retain the axial load filter element within the housing.

12. The axial load filter element of claim 10, wherein the annular projection comprises an annular projection length of at least 10 millimeters.

13. The axial load filter element of claim 10, further comprising a sealing member positioned about the filter media proximate to the closed first endplate, the sealing member configured to engage a cover of a housing to form a substantially liquid-tight seal.

14. The axial load filter element of claim 10, further comprising a permeable baffle wrapped around the filter media, the permeable baffle having an average pore size between 20 micrometers and 200 micrometers, inclusive.

15. An air cleaner system comprising:
a housing comprising a first housing end, a second housing end, an inlet proximate to the second housing end, and a cover removably coupled to a body of the housing proximate to the first housing end, the cover comprising an outer cover surface and an inner cover surface radially separated by a cover thickness, the inner cover surface defining a cover opening; and
a filter element removably installed within the housing through the cover opening, the filter element comprising:
filter media;
a first endplate coupled to the filter media at a first filter end;
an open second endplate coupled to the filter media at a second filter end; and
an annular projection extending axially from the open second endplate in a direction away from the first endplate.

16. The air cleaner system of claim 15, wherein the first endplate comprises a handle assembly removably coupled to the cover.

17. The air cleaner system of claim 16, wherein:
the handle assembly comprises a handle member and a latch, the latch comprising a projection; and
the cover comprises a cover flange extending axially away from the cover in a direction away from the second housing end, the cover flange comprising an aperture configured to receive the projection and removably couple the filter element within the housing.

18. The air cleaner system of claim 15, wherein the housing further comprises a housing projection extending axially away from the second housing end in a direction toward the first housing end, the housing projection facilitating separation between the open second endplate and a second inner end surface of the housing to form an axial gap having a gap width, wherein fluid entering the housing through the inlet flows into the axial gap.

19. The air cleaner system of claim 18, wherein the housing further comprises an outlet, the outlet cooperating with the housing projection so to form a housing cavity for receiving the annular projection, the annular projection cooperating with the housing cavity to form a substantially liquid-tight seal.

20. The air cleaner system of claim 15, wherein the filter element further comprises a sealing member positioned about the filter media proximate to the first endplate, the sealing member configured to engage with the cover so as to form a substantially liquid-tight seal.

* * * * *